United States Patent [19]

Ito et al.

[11] Patent Number: 4,653,385

[45] Date of Patent: Mar. 31, 1987

[54] AIR INTAKE GRILLE

[75] Inventors: Keizo Ito, Ichinomiya; Syoji Murota, Ama-bun, both of Japan

[73] Assignee: Toyoda Gosei Co., Ltd., Nishikasugai, Japan

[21] Appl. No.: 777,681

[22] Filed: Sep. 19, 1985

[30] Foreign Application Priority Data

Sep. 20, 1984 [JP] Japan .................................. 59-198294
Dec. 19, 1984 [JP] Japan .................................. 59-267781
Dec. 19, 1984 [JP] Japan .................................. 59-267782
Dec. 20, 1984 [JP] Japan .................................. 59-269543
Dec. 20, 1984 [JP] Japan .................................. 59-269544

[51] Int. Cl.$^4$ ............................................. F24F 13/12
[52] U.S. Cl. ........................................ 98/40.24; 98/2
[58] Field of Search ................... 98/2, 40.24, 40.27, 98/40.01, 94.2, 101

[56] References Cited

U.S. PATENT DOCUMENTS 3,672,293  6/1972  Gona et al. ........................ 98/40.24

FOREIGN PATENT DOCUMENTS 4498  11/1984  World Int. Prop. O. ......... 98/40.24

Primary Examiner—Harold Joyce
Attorney, Agent, or Firm—Cushman, Darby & Cushman

[57] ABSTRACT

An air intake grille has an air flow guide member mounted on a housing in such a manner that the direction of air flow can be adjusted using a control member. The air flow guide member is constituted by a sheet assembly formed by laminating a multiplicity of perforated sheets. The sheet assembly is retained by retainers in such a manner that the sheets can slide so as to be stepwisely offset from each other. Further, the sheet assembly is mounted on the housing in such a manner as to be pivotal with respect to a fixed plane, which is the front surface of the housing, or a fixed plane parallel to the front surface. The air intake grille with the above arrangement enables the air flow guide member to be orientated to any desired direction in a single operation of the control member. Since the housing is not split into front and rear portions and the air flow guide member can be handled as an integrated sheet assembly, it is possible to reduce the time and labor required for manufacturing and assembling the air intake grille.

1 Claim, 34 Drawing Figures

AIR INTAKE GRILLE

BACKGROUND OF THE INVENTION

The present invention relates to an air intake grille which is mounted at an air outlet of an automobile or the like and has an air flow guide member mounted on a housing in such a manner that the direction of air flow can be adjusted using a control member.

An air intake grille of the type described above is mounted at an air outlet A provided in a dashboard of an automobile as shown in FIG. 1. This air intake grille is arranged as illustrated in FIGS. 2 and 3. The grille includes air flow guide members which are composed of two groups, that is, a first guide member group 102 constituted by a plurality of vertical blades (elements) 101 for adjusting the direction of air flow to the left or right and a second guide member group 104 which is constituted by a plurality of horizontal blades (elements) 103 for adjusting the direction of air flow upwards or downwards. The first and second guide members 102 and 104 are mounted in a housing 105 when the split front and rear portions 106 and 107 of the housing 105 are joined together in such a manner that support shafts 101a which project from both ends of each vertical blade 101 and support shafts 103a which project from both ends of each horizontal blade 103 are respectively fitted into the corresponding shaft-receiving bores provided in both the upper and lower walls and the right and left walls. Pins 101b and 103b which project from both ends of each vertical blade 101 and each horizontal blade 103 are fitted into the corresponding shaft-receiving bores 111a and 112a provided in link plates 111 and 112 so that each of the first guide member group 102 (the vertical blades 101) and the second guide member group 104 (the horizontal blades 103) can move in one unit in response to the movement of the corresponding link plate 111 or 112. The control lever (control member) 113 has a grip 113a which projects from the front side of the housing 105. The control lever 113 further has a slot 113b formed in its center and a U-shaped notch 113c formed at its distal end. One of the vertical blades 101 is inserted into the slot 113b, and one of the horizontal blades 103 is engaged with the notch 113c. Accordingly, the direction of air flow can be adjusted both horizontally and vertically by pivoting the control lever 113 horizontally and moving the same vertically, respectively. It must be noted that the split front and rear portions 106 and 107 of the housing 105 are inseparably connected together when joined in such a manner that pawl plates 107a which are provided on the rear portion 107 firmly elastically engage with respective engagement bores 106a provided in the front portion 106. In the illustrated example, the reference numeral 115 denotes a mounting boss which is cut with an internal thread. The elements or parts which constitute the air intake grille, such as the housing and the blades, are generally formed by injection molding of a synthetic resin such as ABS, PP and polyamide.

An air intake grille with the above arrangement, however, suffers from the following problems.

(a) Since the adjustment of the direction of air flow in horizontal and vertical directions is independently effected by the first and second guide member groups, respectively, it is generally necessary to conduct a troublesome operation in which the control level is actuated in two steps for effecting the adjustment of air flow in the horizontal and vertical directions.

(b) Since the guide members are supported in the directions orthogonal to the longitudinal direction of the housing, it is necessary to split the housing into two portions and to form a mechanism for combining the split portions. This means that the configuration of the housing is complicated, and the cost of making a mold for the housing increased.

(c) Since the housing is split into two portions, and it is necessary to assemble the first and second guide member groups using separate blades, the time and labor required for assembling the grille are increased.

SUMMARY OF THE INVENTION

The present invention pertains to an air intake grille in which an air flow guide member is mounted on a housing so that the direction of air flow can be adjusted using a control member. The air flow guide member is constituted by a sheet assembly which is formed by laminating a multiplicity of perforated sheets with the same planar configuration, or alternately laminating first and second sheets each having a plurality of laterally or longitudinally elongated bores formed in parallel. This sheet assembly is retained by retainers in such a manner that the sheets constituting the sheet assembly can slide so as to be stepwisely offset from each other. Further, the sheet assembly is mounted on the housing in such a manner as to be pivotal with respect to a fixed plane, which is the front surface of the housing, or a fixed plane parallel to the front surface.

With the above arrangement, it is an object of the present invention to provide an air intake grille offering the following advantages.

(a) It is possible to obtain an arrangement in which the air flow guide member can be orientated to any desired direction by a single operation of the control member, so that adjustment of the direction of air flow is facilitated.

(b) Since the air flow guide member is supported longitudinally in the housing, it is not necessary to split the housing longitudinally. Thus, the configuration of the housing is simplified, and it is possible to reduce the cost of making a mold for the housing.

(c) Since the housing need not be split, as mentioned above, and the air flow guide member can be handled as one unit, that is, a sheet assembly, the time and labor required for assembling the grille can be reduced by a large margin.

DESCRIPTION OF THE PREFERRED EMBODIMENTS

Figure 1:
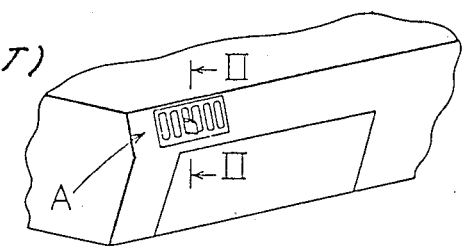
FIG. 1 is a fragmentary perspective view of a dashboard which shows the position at which an air intake grille is mounted.
Figure 2:
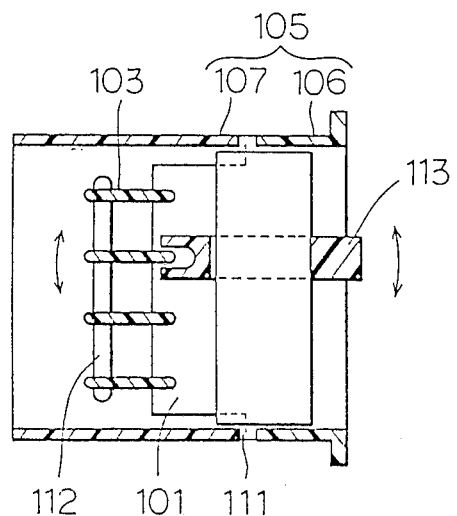
FIG. 2 is a section through a conventional air intake grille, taken along the line II—II of FIG. 1.
Figure 3:
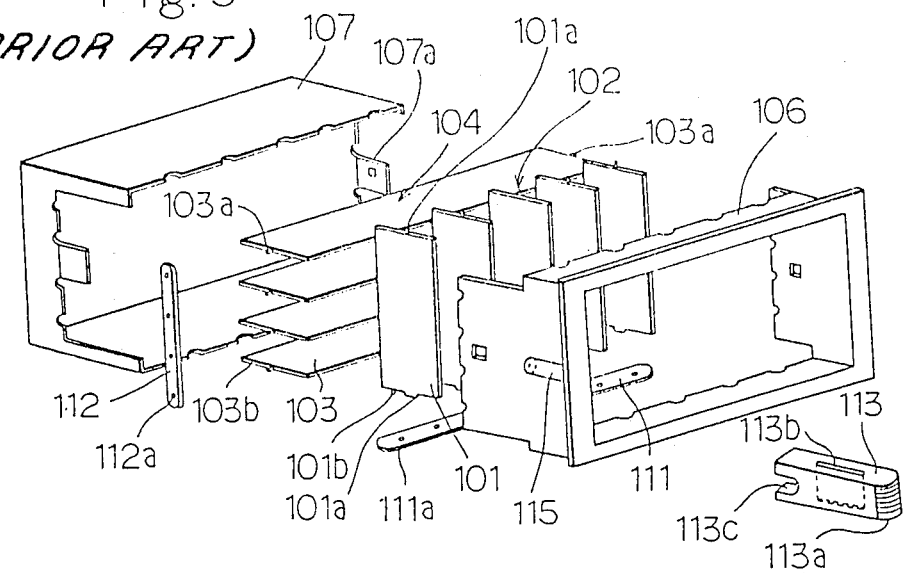
FIG. 3 is an exploded perspective view of the air intake grille shown in FIG. 2.

Each of the embodiments of the present invention is described below with reference to the accompanying drawings. It must be noted that the housing in each embodiment is formed of a synthetic resin by injection molding or other similar means as in the case of the conventional air intake grille.

(1) First Embodiment (FIGS. 4 to 9)

The first embodiment comprises a housing 1, an air flow guide member 2, a first retainer 4, a pair of second retainers 5, and a control lever (control member) 7.

The housing 1 has the shape of a hollow parallelepiped which has a flange along the outer periphery of its front surface which is constituted by a grille member of vertical and horizontal bars. A control member guide rod 1a is disposed in the substantially central portion of the grille member. A pair of spherical end-receiving surfaces 1b and 1b are formed on the housing 1 at positions symmetrical to each other with respect to the guide rod 1a. It must be noted that the cross-sectional configuration of the guide rod 1a is not necessarily limited to the illustrated circular shape and may be triangular, square or hexagonal.

The air flow guide member 2 is constituted by a multiplicity (e.g., 10 to 20) of sheets 3 (generally 0.5 to 1.5 mm in thickness) having the same planar configuration. When the sheets 3 are laminated into a sheet assembly, shaft engaging grooves 2a are formed on both sides of the sheet assembly so as to extend horizontally in a central position between the upper and lower ends of the sheet assembly, and a plurality of air flow guide bores 2b are formed longitudinally through the sheet assembly. Each sheet 3 is obtained by blanking a sheet of a synthetic resin such as ABS or PP, or a sheet of paper, or by injection molding or other similar means.

The first retainer 4 is constituted by a slender plate-like member which has a slit-like engagement bore 4a in its center and spherical end-receiving surfaces 4b at both its ends. The retainer 4 is preferably constituted by a leaf spring (made of a steel or synthetic resin) for the purpose of ensuring the required retainability.

Each of the second retainers 5 is constituted by a shaft-like member which has spherical longitudinal ends.

The distal end portion of the control lever 7 is formed into an engagement plate portion 7b having at both sides pawls 7a for preventing the control lever 7 from disengaging from the first retainer 4, while the proximal portion of the control lever 7 is formed into a U-shaped knob 7d having an engagement groove 7c which extends laterally thereof.

This air intake grille is assembled as follows.

First, the laminated air flow guide member 2 is brought into contact with the reverse surface of the grille member of the housing 1 in such a manner that the air flow guide bores 2b coincide with the corresponding openings of the grille member. The second retainers 5 are respectively engaged with the shaft engaging grooves 2a on both sides of the air flow guide member 2. Further, the first retainer 4 is brought into contact with the rear side of the air flow guide member 2. Subsequently, the control lever 7 is inserted into the housing 1 from its front side (the grille member side) and passed through the air flow guide member 2. The control lever 7 is forced into the housing 1 until the distal end portion of the lever 7 is engaged with the engagement bore 4a of the first retainer 4 and the engagement groove 7c formed in the U-shaped knob 7d of the lever 7 is engaged with the guide rod 1a at the front side of the housing 1. In consequence, each of the second retainers 5 is supported between the pair of opposing spherical end-receiving surfaces 1b and 4b which are respectively formed in the reverse side of the grille member of the housing 1 and the first retainer 4. Accordingly, the air flow guide member 2 is retained by the first and second retainers 4 and 5 in such a manner that the sheets 3 can slide so as to be stepwisely offset from each other. It is also possible for the air flow guide member 2 to be deformed in such a manner that its longitudinal axis pivots in the vertical and horizontal directions with respect to the front side of the housing 1 which serves as a fixed plane.

Figure 5:
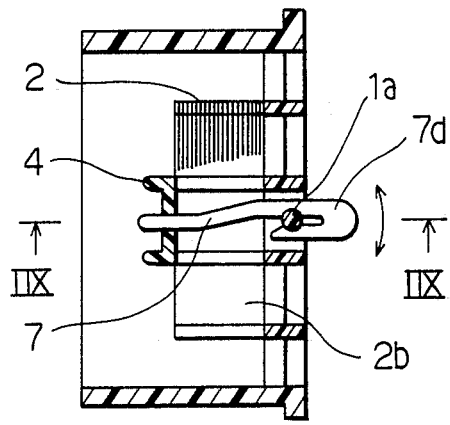
FIG. 5 is a section through the first embodiment when assembled, taken along the line V—V of FIG. 4.
Figure 7:
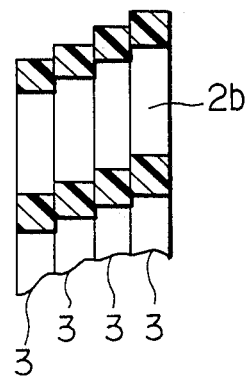
FIG. 7 is an enlarged view of the portion VII of the first embodiment shown in FIG. 6.
Figure 6:
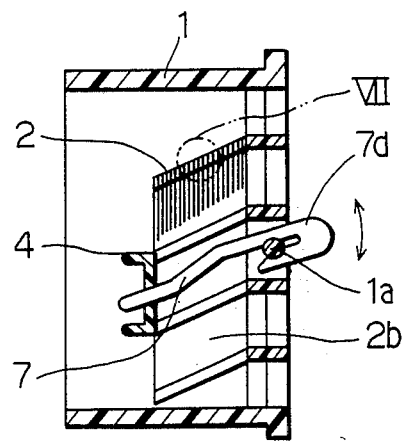
FIG. 6 is a section through the first embodiment shown in FIG. 5 in a state wherein the control member is moved upwards.
Figure 8:
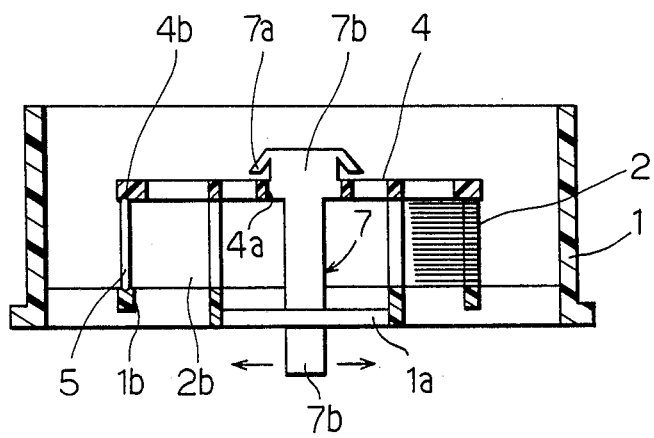
FIG. 8 is a section taken along the line IIX—IIX of FIG. 5.
Figure 9:
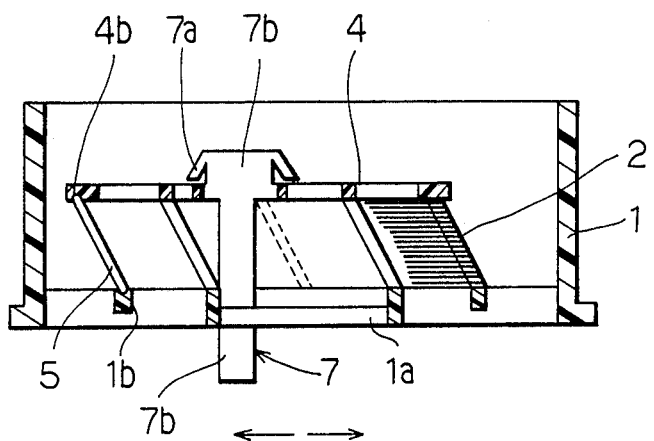
FIG. 9 is a section through the portion of the first embodiment shown in FIG. 8 in a state wherein the control member is moved to the left.

The air intake grille assembled as above is mounted at an air outlet or the like of an automobile similarly to the conventional air intake grille. The adjustment of the direction of air flow is effected in such a manner that an occupant holds the knob 7d of the control lever 7 with his fingers or hand and pivots the same vertically as shown in FIGS. 5 and 6, or slides the knob 7d horizontally as shown in FIGS. 8 and 9. In such a case, the sheets 3 constituting the air flow guide member 2 slide so as to be stepwisely offset from each other in the direction in which the knob 7d is moved, as shown in FIG. 7, thereby orientating the air flow guide bores 2b to a given direction.

Figure 10:
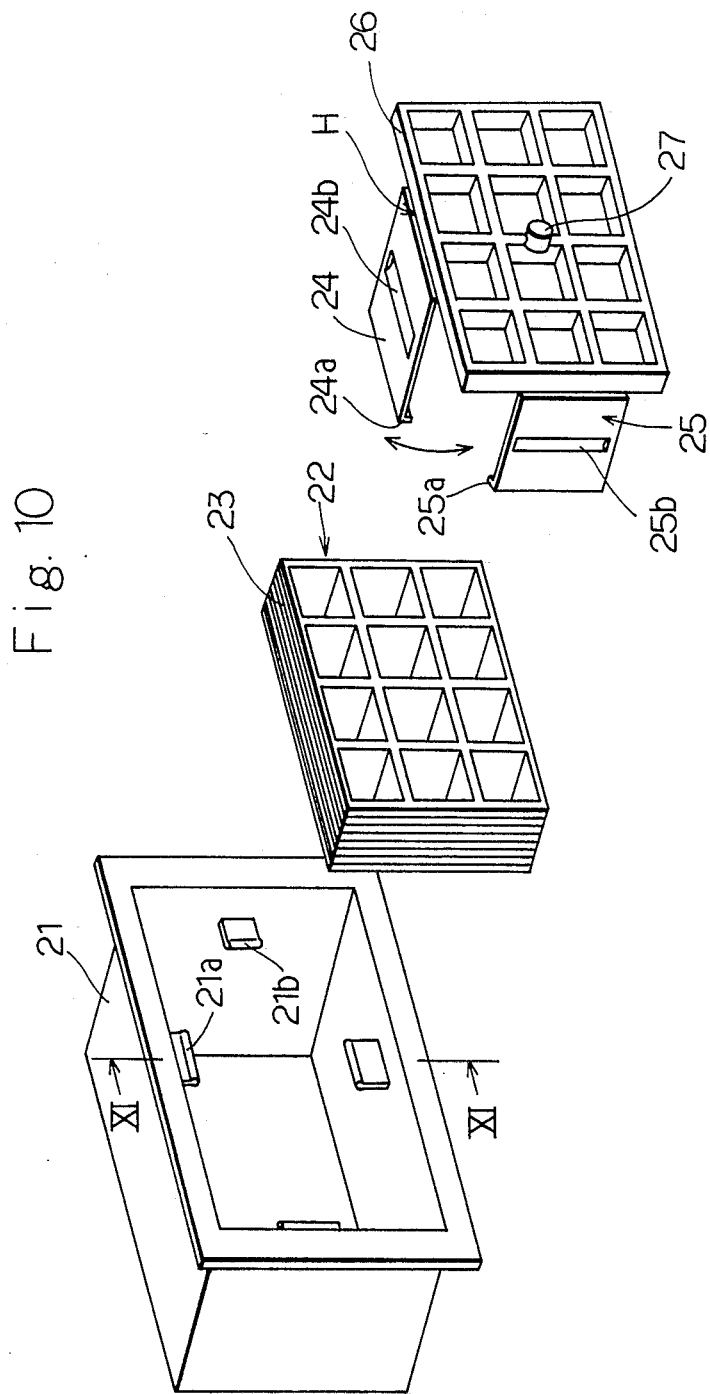
FIG. 10 is an exploded perspective view of a second embodiment of the present invention.
Figure 11:
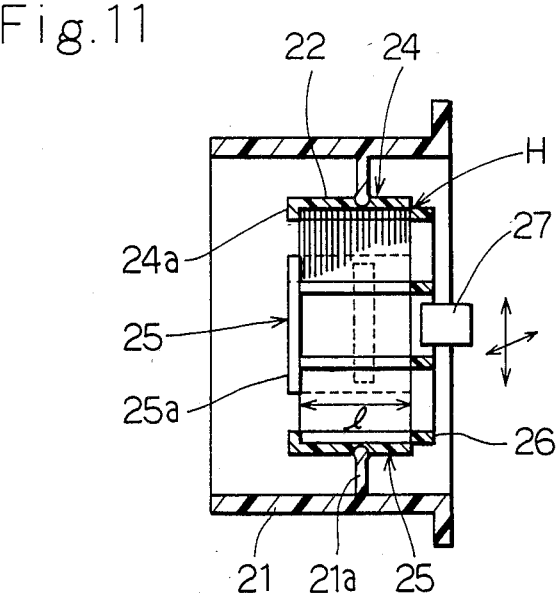
FIG. 11 is a section through the second embodiment when assembled, taken along the line XI—XI of FIG. 10.
Figure 12:
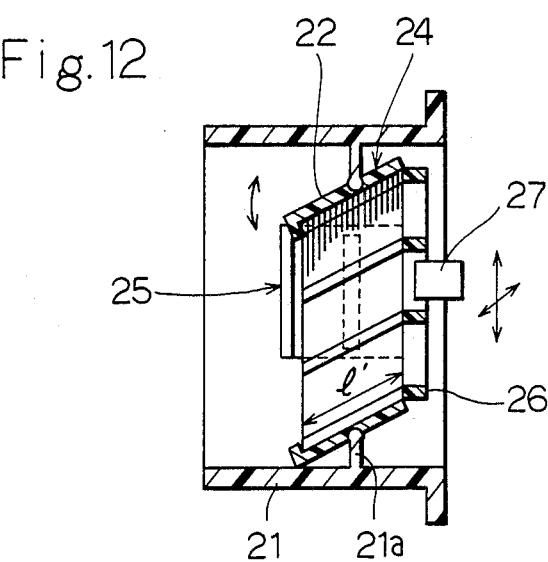
FIG. 12 is a section through the second embodiment shown in FIG. 11 in a state wherein the control member is moved upwards.

(2) Second Embodiment (FIGS. 10 to 12)

The air intake grille in accordance with the second embodiment comprises a housing 21, an air flow guide member 22, and a grille member 26.

The housing 21 has the shape of a hollow parallelepiped with a flange formed along the outer periphery of its front side but does not have a grille member such as that employed in the first embodiment. Support plates 21a and 21b each having a columnar portion at the distal end are disposed at respective inner positions on the inner peripheral walls of the housing 11, that is, the upper and lower as well as right and left walls, so that all the support plates are included in one plane parallel to the front surface of the housing 11, and the support plates 21a, 21a and 21b, 21b oppose each other, respectively.

The air flow guide member 22 is similar to that of the first embodiment but has no second-retainer engaging groove.

The grille member 26 has the same planar configuration as that of the air flow guide member 22. The grille member 26 has a control knob (control member) 27 integrally formed at the center of its front surface and retainer plates 24 and 25 integrally attached to its four sides, respectively. Each of the retainer plates 24 and 25 is integrated with the grille member 26 by employing an integral hinge H of PP or the like. The retainer plates 24 and 25 have hooks 24a and 25a at their respective free ends. Column-receiving grooves 24b and 25b are formed on the respective outer surfaces of the support plates 21a and 21b so as to correspond to the respective columnar portions of the support plates 21a and 21b.

This embodiment is assembled as follows.

First, the laminated air flow guide member 22 is superposed on the reverse surface of the grille member 26 in a state wherein the retainer plates 24 and 25 are opened. Then, the retainer plates 24 and 25 are pivoted in the direction in which they are closed so that the air flow guide member 22 is retained by the retainer plates 24 and 25. The grille member 26 which thus retains the air flow guide member 22 is forced into the housing 21 from its front side. In consequence, after the support plates 21a and 21b are slightly bent, their columnar distal end portions are firmly yet elastically fitted into the corresponding column-receiving grooves 24a and 25b of the retainer plates 24 and 25. Thus the grille member 26 is supported by the turning pairs, and the air flow guide member 22 is retained by the retainer plates 24 and 25 in such a manner that the sheets 23 can slide so as to be stepwisely offset from each other. In addition, the air flow guide member 22 can be deformed in such a manner that its longitudinal axis pivots in any desired direction, including the upward and downward as well as rightward and leftward directions, with respect to a fixed plane which is a longitudinally intermediate plane of the member 22 parallel to the front surface of the housing 21. It must be noted that the distance between the front and rear sides of the air flow guide member 22 at its upper and lower ends differs when the sheets 23 are aligned with each other (see FIG. 11) and when the sheets 23 are stepwisely offset from each other (see FIG. 12), that is, $l<l'$, and when the control knob 27 is vertically moved, the air flow guide member 22 is retained by the retainer plates 24 and 25. For this reason, the length of each of the retainer plates 24 and 25 is made larger than said distance of the guide member 22 at the time when the sheets 23 are aligned with each other by an amount whereby the retainer plates 24 and 25 can satisfactorily retain the guide member 22.

The air intake grille thus assembled is used in the following way. Similarly to the case of the first embodiment, the air intake grille is mounted at an air outlet of an automobile, and the adjustment of the direction of air flow is effected in such a manner that an occupant holds the control knob 27 with his fingers or hand and moves the knob 27 within a circular plane parallel to the front surface of the housing 11 in any desired direction, including the vertical, horizontal and diagonal directions, as shown in FIGS. 11 and 12. In consequence, the air flow guide bores 22b can be orientated in the desired direction, since the air flow guide member 22 can be deformed through the retainer plates 24 and 25 integrated with the grille member 26 in such a manner that the longitudinal axis of the guide member 22 pivots with respect to a fixed plane, which is the plane of the guide member 22 parallel to the front surface of the housing 11.

In contrast to the first embodiment, the second embodiment enables an increase in the degree of freedom in selection of the direction of air flow, since the range of directions in which the control member is moved is not restricted. In addition, it is possible to effect the adjustment of the direction of air flow in a single operation, so that controllability is improved.

Figure 13:
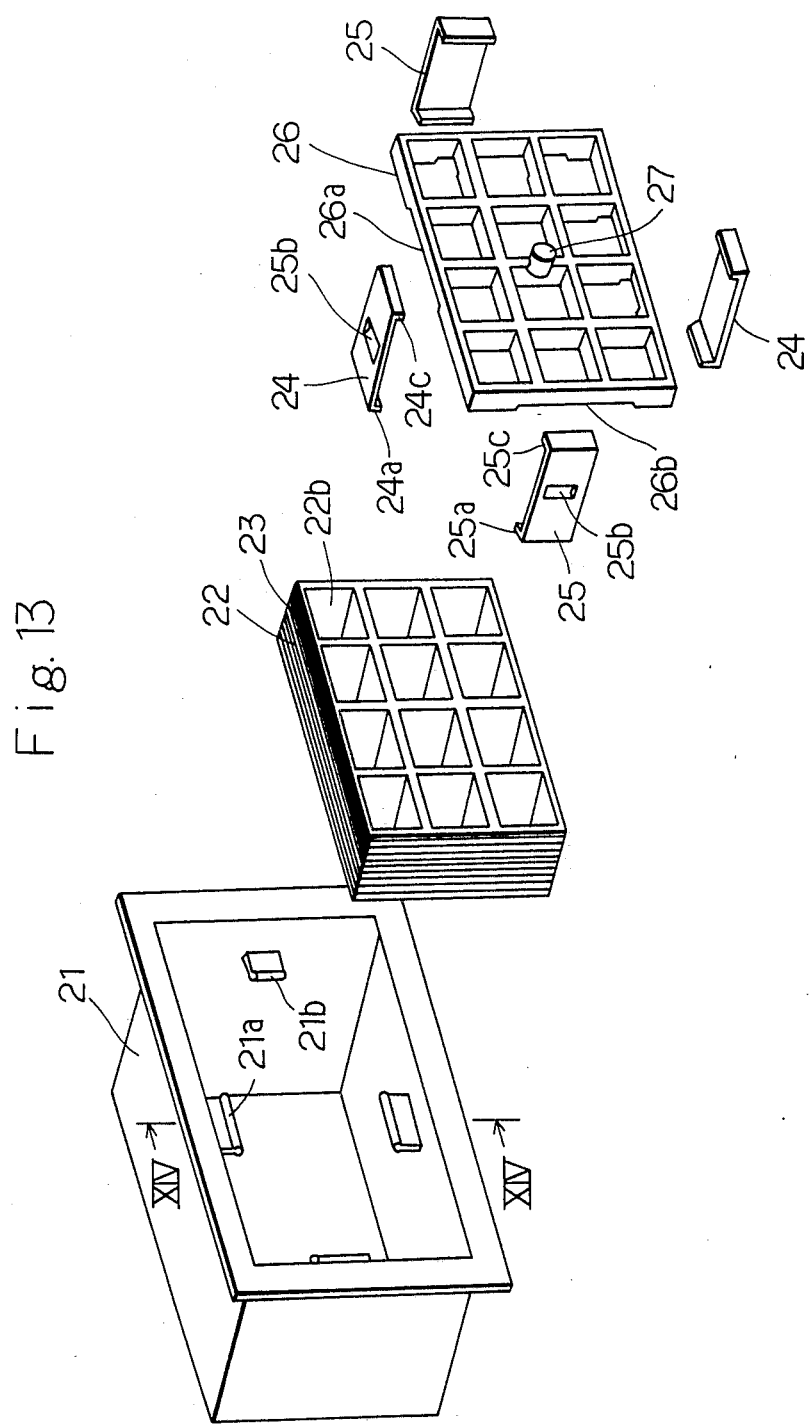
FIG. 13 is an exploded perspective view of a third embodiment of the present invention.
Figure 14:
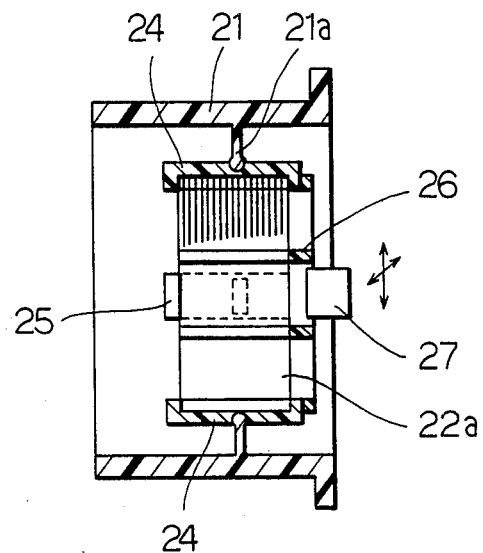
FIG. 14 is a section through the third emodiment when assembled, taken along the line XIV—XIV of FIG. 13.
Figure 15:
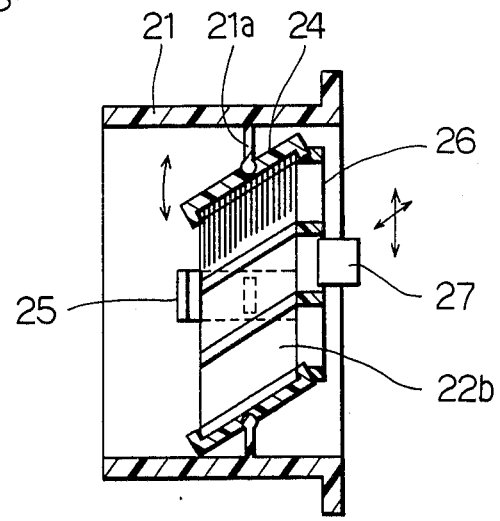
FIG. 15 is a section through the third embodiment shown in FIG. 14 in a state wherein the control member is moved upwards.

(3) Third Embodiment (FIGS. 13 to 15)

In this embodiment, the retainer plates 24 and 25 are constituted by members which are separate from the grille member 26. Accordingly, the range of materials for the grille member 26 is not particularly limited (the second embodiment can employ only a material which is able to serve as a plastic hinge), so that it is possible to form the grille member 26 by employing a relatively soft material (e.g., soft PVC).

The retainer plates 24, 25 and the grille member 26 are joined together as follows. Notches 26a and 26b are formed in the respective reverse surfaces of the four sides of the grille member 26, and hooks 24c and 25c are formed at the respective proximal ends of the retainer plates 24 and 25. With the hooks 24c and 25c engaged with the notches 26a and 26b, one of the sheets 23 constituting the air flow guide member 22 is bonded to the reverse side of the grille member 26. As a result, the retainer plates 24 and 25 are pivotally connected to the grille member 26.

It must be noted that although the air flow guide bores in the first to third embodiments are all rectangular, it is possible to select any desired shape for the air flow guide bores, such as a circular, triangular or hexagonal shape.

Although the front end or intermediate portion of the air flow guide member 2 or 22 is employed as a fixed plane for the pivotal movement of the member 2 or 22, the rear end thereof may be employed as the fixed plane.

Figure 16:
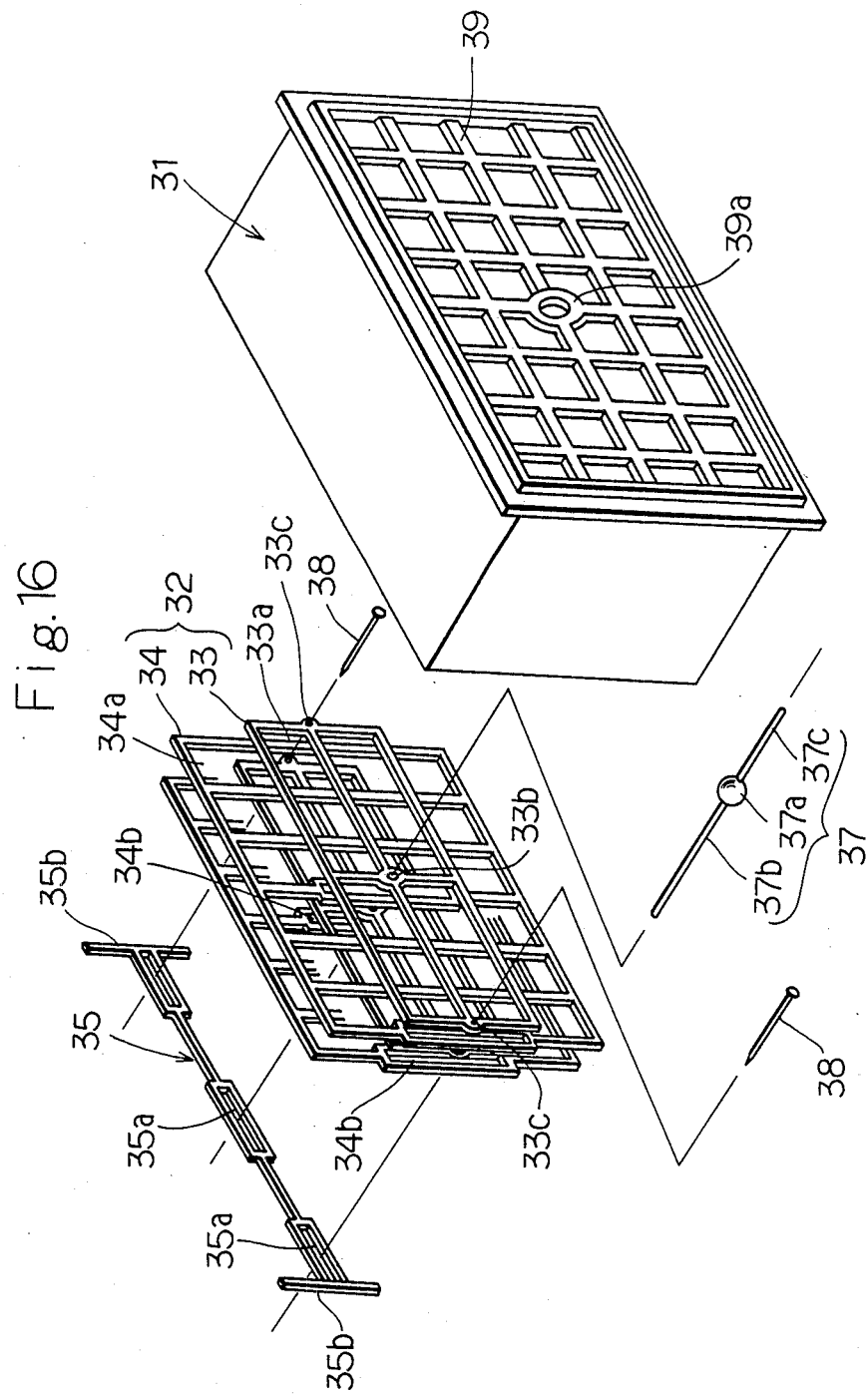
FIG. 16 is an exploded perspective view of a fourth embodiment of the present invention.
Figure 17:
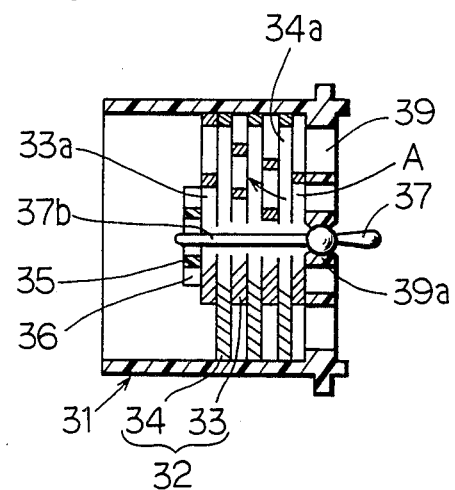
FIG. 17 is a vertical section through the fourth embodiment when assembled.
Figure 18:
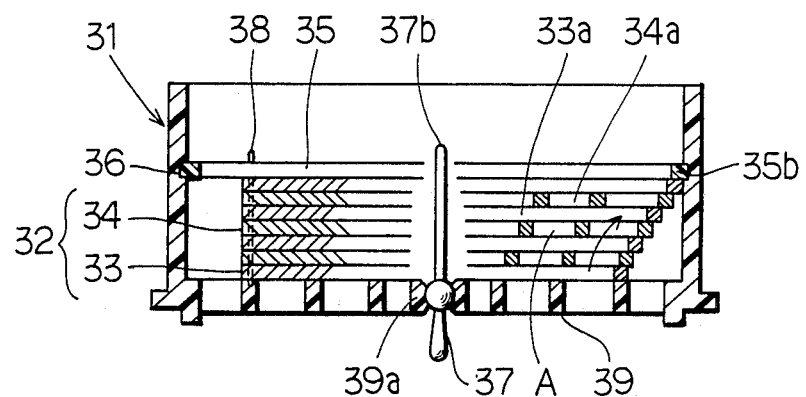
FIG. 18 is a horizontal section through the fourth embodiment when assembled.
Figure 19:
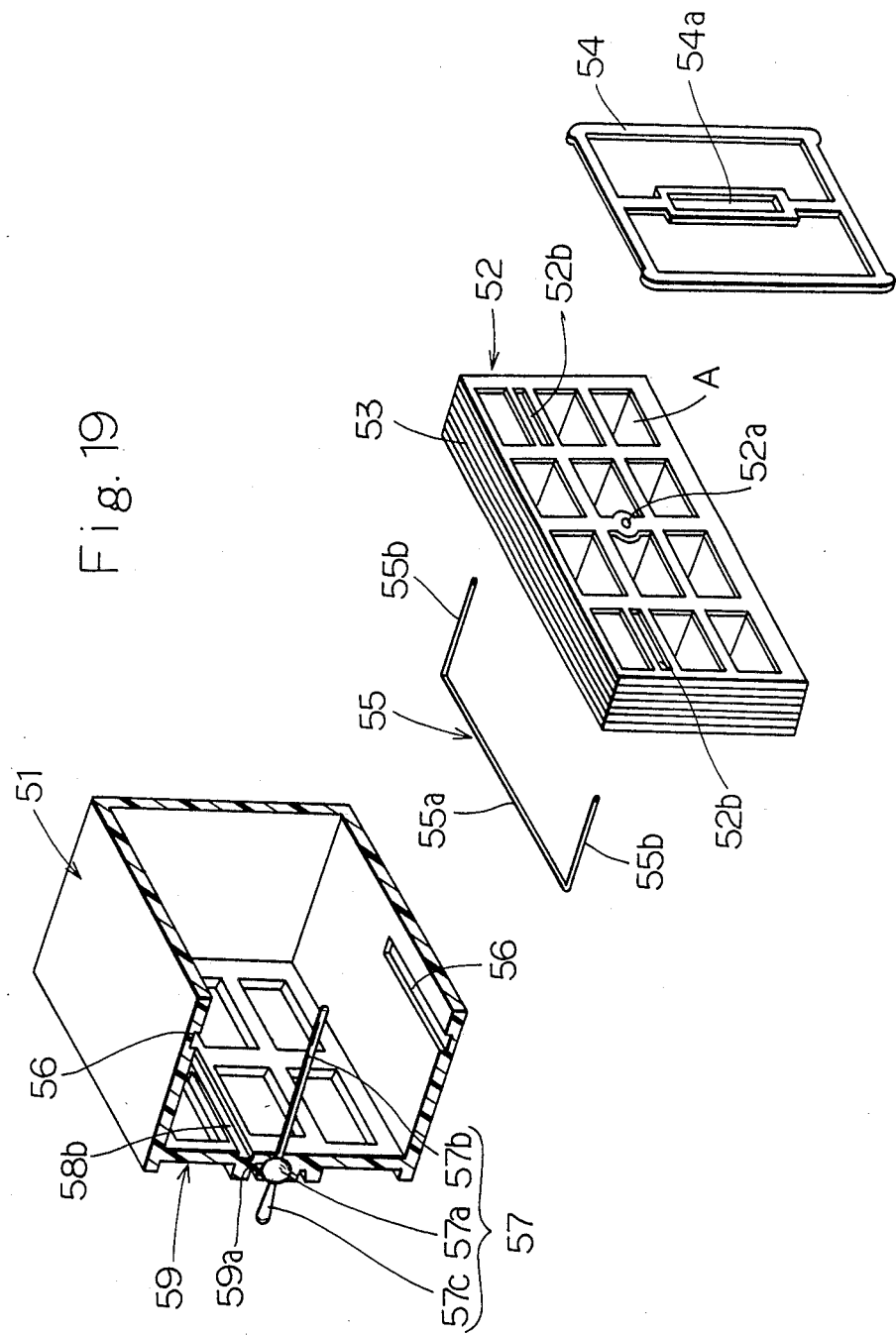
FIG. 19 is an exploded perspective view ot a fifth embodiment of the present invention, which shows a notch formed in the housing.
Figure 20:
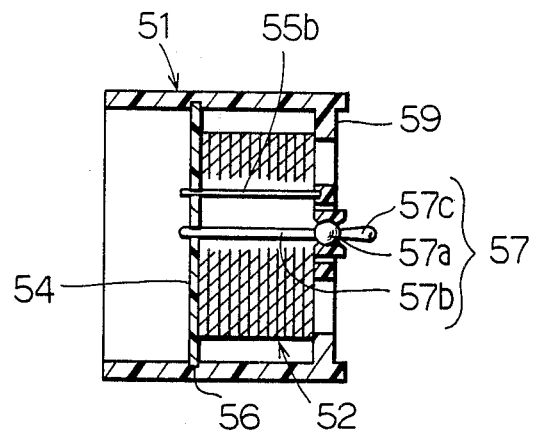
FIG. 20 is a vertical section through the fifth embodiment when assembled.
Figure 21:
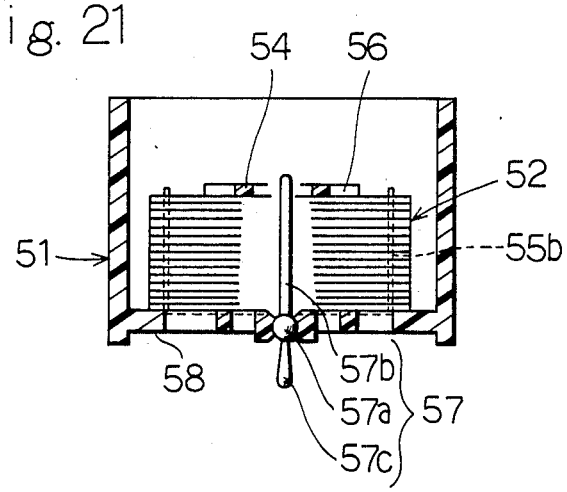
FIG. 21 is a horizontal section through the fifth embodiment when assembled.

(4) Fourth Embodiment (FIGS. 16 to 18)

This embodiment comprises a housing 31, an air flow guide member 32, a rear retainer 35, a pair of connecting pins 38 and a control member 37. The housing 31 has the shape of a hollow parallelepiped with a flange along the outer periphery of its front surface which is constituted by a fixed grille member 39 of vertical and horizontal bars. The control member 37 is composed of a ball portion 37a, and a drive pin 37b and a knob 37c disposed on both sides of the ball portion 37a. The ball portion 37a is supported by a pair of opposing spherical surfaces of a ball-receiving portion 39a which is formed in the center of the fixed grille member 39. The rear retainer 35 has the shape of an H which is composed of a horizontal bar and slide leg portions 35b provided at both ends of the bar which has horizontally elongated guide slits 35a at its center and both ends. The rear retainer 35 is engaged, through the slide leg portions 35b, with a pair of slide grooves 36 which are respectively formed in the right and left inner wall surfaces of the housing 31 so as to extend vertically. Thus, the retainer 35 is retained by the housing 31 so as to be immovable in the longitudinal direction of the housing 31. The air flow guide member 32 is constituted by a sheet assembly formed by alternately laminating first and second sheets 33 and 34. Each first sheet 33 is rectangular and has a plurality of horizontally elongated bores 33a disposed parallel to each other vertically in correspondence with the distance between two adjacent horizontal bars of the fixed grille member 39. The first sheet 33 further has a drive pin-receiving bore 33b in its center and connecting pin-receiving bores 33c at both its lateral end portions and possesses a width equal to that of each of the second sheets 34 and a height lower than that of the latter. Each second sheet 34 has a plurality of vertically elongated bores 34a disposed parallel to each other horizontally in correspondence with the distance between two adjacent vertical bars of the grille member 39. The second sheet 34 further has vertically elongated guide slits 34b at its center and both lateral end portions and possesses a height which enables the sheet 34 to slide horizontally along the upper and lower inner walls of the housing 31. The sheet assembly has air flow guide bores A defined by the horizontally elongated bores 33a of the first sheets 33 and the vertically elongated bores 34a of the second sheets 34 which intersect each other, the guide bores A corresponding to the openings of the grille member 39. The drive pin 37b of the control member 37 is received through the drive pin-receiving bores 33b, the vertically elongated guide slits 34b and the horizontally elongated guide slit 35a formed in the respective centers of the first and second sheets 33, 34 and the rear retainer 35. The pair of connecting pins 38 are received through the connecting pin-receiving bores 33c, the vertically elongated guide slits 34b and the horizontally elongated guide slits 35a provided at both ends of the first and second sheets 33, 34 and the rear retainer 35, whereby it is possible for the connecting pins 38 to be maintained in the horizontal state. It must be noted that each of the sheets 33 and 34 is obtained by blanking a sheet of a synthetic resin such as ABS or PP, or a sheet of paper, or injection molding or other similar means.

The following is a description of the way in which this embodiment is used.

When an occupant holds the knob 37c of the control member 37 with his fingers or hand and moves the knob 37c vertically from the neutral position, the first sheets 33 alone are slid by the action of the drive pin 37b (at this time, the drive pin 37b slides within the vertically elongated guide slits 34b of the second sheets 34); when the knob 37c is moved horizontally or diagonally, the first and second sheets 33 and 34 are moved, the second sheets 34 sliding along the inner wall surfaces of the housing 31. Thus, the sheets slide so as to be stepwisely offset from each other, and the air flow guide bores A are thereby orientated to a given direction. During the above-described operation, since the rear retainer 35 can slide vertically but cannot move in the longitudinal direction of the housing 31, the sheet assembly constituted by the first and second sheets 33 and 34 are retained between the rear retainer 35 and the fixed grille member 39 in the longitudinal direction of the housing 31. Further, since the pair of connecting pins 38 slide within the vertically elongated guide slits 34b provided at both lateral ends of each of the second sheets 34 at all times, the connecting pins 38 are supported horizontally, and this is further ensured by means of the horizontally elongated guide slits 35a and slide leg portions 35b provided at both ends of the rear retainer 35.

The rear retainer of the above-described embodiment is not necessarily exclusive and other retaining means may be employed, provided that the means employed is retained by the housing so as to be immovable in the longitudinal direction of the housing and does not obstruct the movement of the drive pin for orientating the air flow guide bores to a given direction, for example, a frame member which slides along the upper and lower inner walls of the housing, or a spring wire which is stretched vertically or horizontally between the opposing inner walls of the housing.

Further, the way in which the connecting pins are horizontally supported is not necessarily limited to that employed in the above-described embodiment.

It must be noted that the sheets are drawn in the Figures in such a way that they have a relatively large thickness and the number of sheets is relatively small from the illustrative point of view. In fact, the thickness is much smaller (0.5 to 1.5 mm, in general), and the number of sheets is larger than that of the illustrated ones, for example, 10 to 20 sheets.

(5) Fifth Embodiment (FIGS. 19 to 22)

This embodiment comprises a housing 51, an air flow guide member 52, a rear retainer 54, a connecting retainer 55 and a control member 57.

The control member 57 is composed of a ball portion 57a, and a drive rod 57b and a knob 57c disposed at both sides of the ball portion 57a. The ball portion 57a is supported by a pair of opposing spherical surfaces of a ball-receiving portion 59a which is formed in a substantially central portion of a front grille member 59 of the housing 51. The connecting retainer 55 is composed of a support shaft 55a and connecting rods 55b respectively provided at both ends of the support shaft 55a. The support shaft 55a is fitted into a support groove 59b which is formed in the reverse surface of one of the horizontal bars of the grille member 59 in such a manner that the connecting rods 55b can pivot vertically. The rear retainer 54 is constituted by a vertically elongated frame member which is designed in correspondence with the arrangement of the vertical bars of the grille member 59. The rear retainer 54 has a vertically elongated guide slit 54a formed in its central vertical bar. The retainer 54 is slidably engaged with a pair of slide grooves 56 which are formed in the upper and lower inner wall surfaces of the housing 51 so as to extend horizontally. The air flow guide member 52 is constituted by a sheet assembly composed of a multiplicity of perforated sheets 53 with the same planar configuration, each sheets 53 having openings corresponding to the openings of the grille member 59. The air flow guide member 52 is clamped between the front grille member 59 and the rear retainer 54 in such a manner that the sheets 53 can slide so as to be stepwisely offset from each other. The drive rod 57b of the control member 57 is received through a drive rod-receiving bore 52a which is formed in the center of the air flow guide member 52, and the connecting rods 55b of the connecting retainer 55 are respectively received through the horizontally elongated guide slits 52b which are formed at both lateral end portions of the air flow guide member 52. The drive rod 57b of the control member 57 is also received through the vertically elongated guide slit 54a of the rear retainer 54.

The way in which this embodiment is used will next be described.

Figure 4:
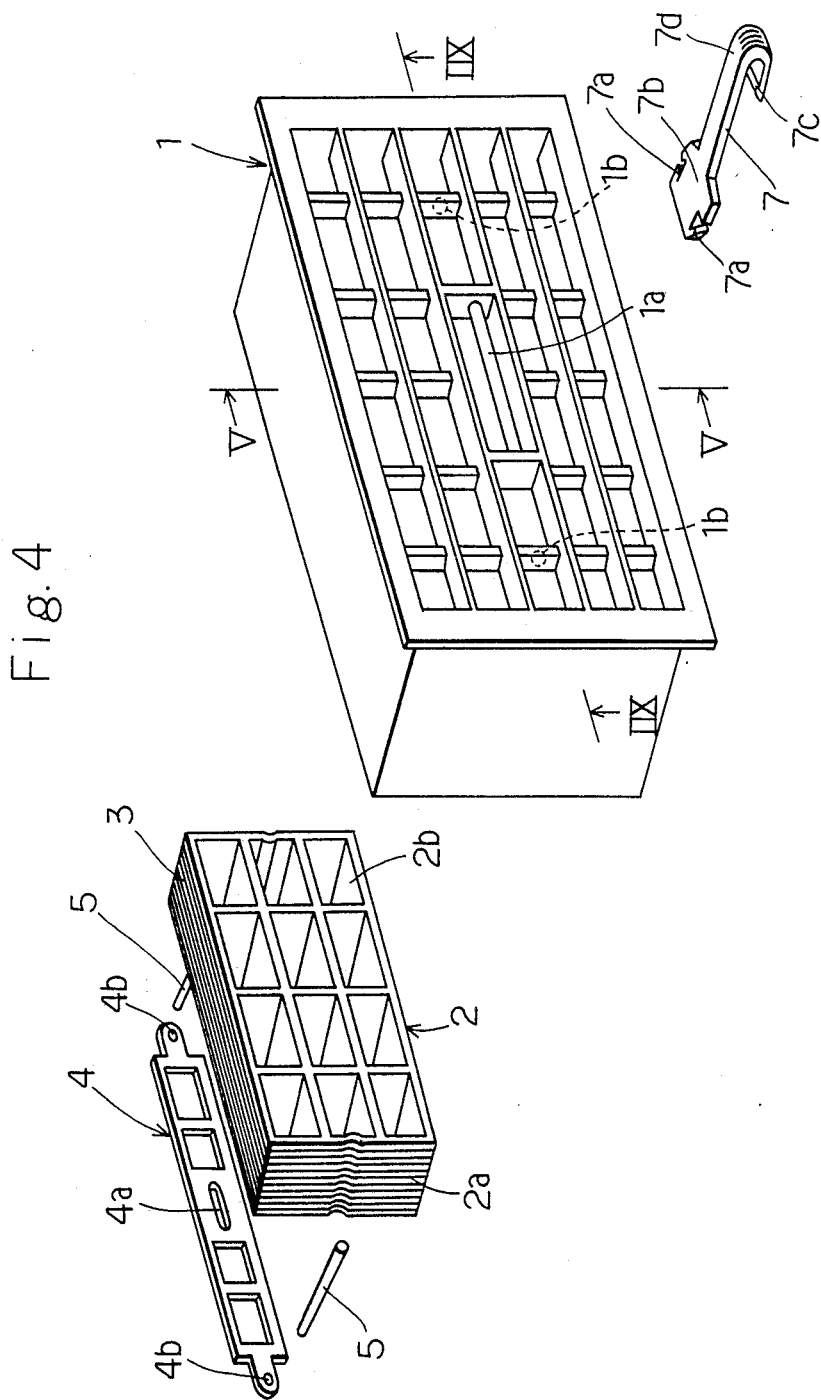
FIG. 4 is an exploded perspective view of a first embodiment of the present invention.
Figure 22:
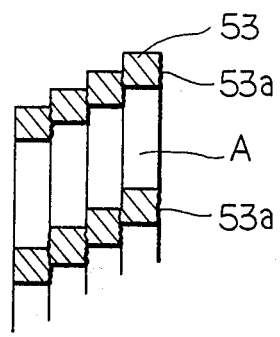
FIG. 22 is a fragmentary enlarged view of the fifth embodiment shown in FIG. 20, which shows the relationship between the sheets in a state wherein the control member is moved downwards.

When an occupant holds the knob 57c of the control member 57 and moves the same vertically, horizontally or diagonally, the sheets 53 constituting the air flow guide member (sheet assembly) 52 slide so as to be stepwisely offset from each other as shown in FIG. 4 in accordance with the movement of the drive rod 57b and stop in this position by virtue of the frictional force generated between the adjacent sheets 53, whereby the air flow guide bores A are orientated to a given direction. During this operation, since the rear retainer 54 can move horizontally but cannot move in the longitudinal direction of the housing 51, the distance by which the sheet assembly 52 is clamped is invariable, so that there is no risk of the sheet assembly 52 being undesirably pressed even when the control member 57 is tilted. Further, since the connecting rods 55b of the connecting retainer 55 are connected together by the support shaft 55a, the connecting rods 55b received through the guide slits 52b provided at both lateral end portions of the air flow guide member 52 prevent the guide member 52 from being twisted, that is, offers a horizontally retaining effect. It must be noted that it is preferable, although not always necessary, to form either or both of the surfaces of each of the sheets 53 into uneven surfaces 53a as shown in FIG. 22 for the purpose of practically reducing the area of contact between two adjacent sheets 53. By so doing, the frictional resistance is reduced, and it is possible for the sheets 53 to slide smoothly when stepwisely offset from each other.

Figure 23:
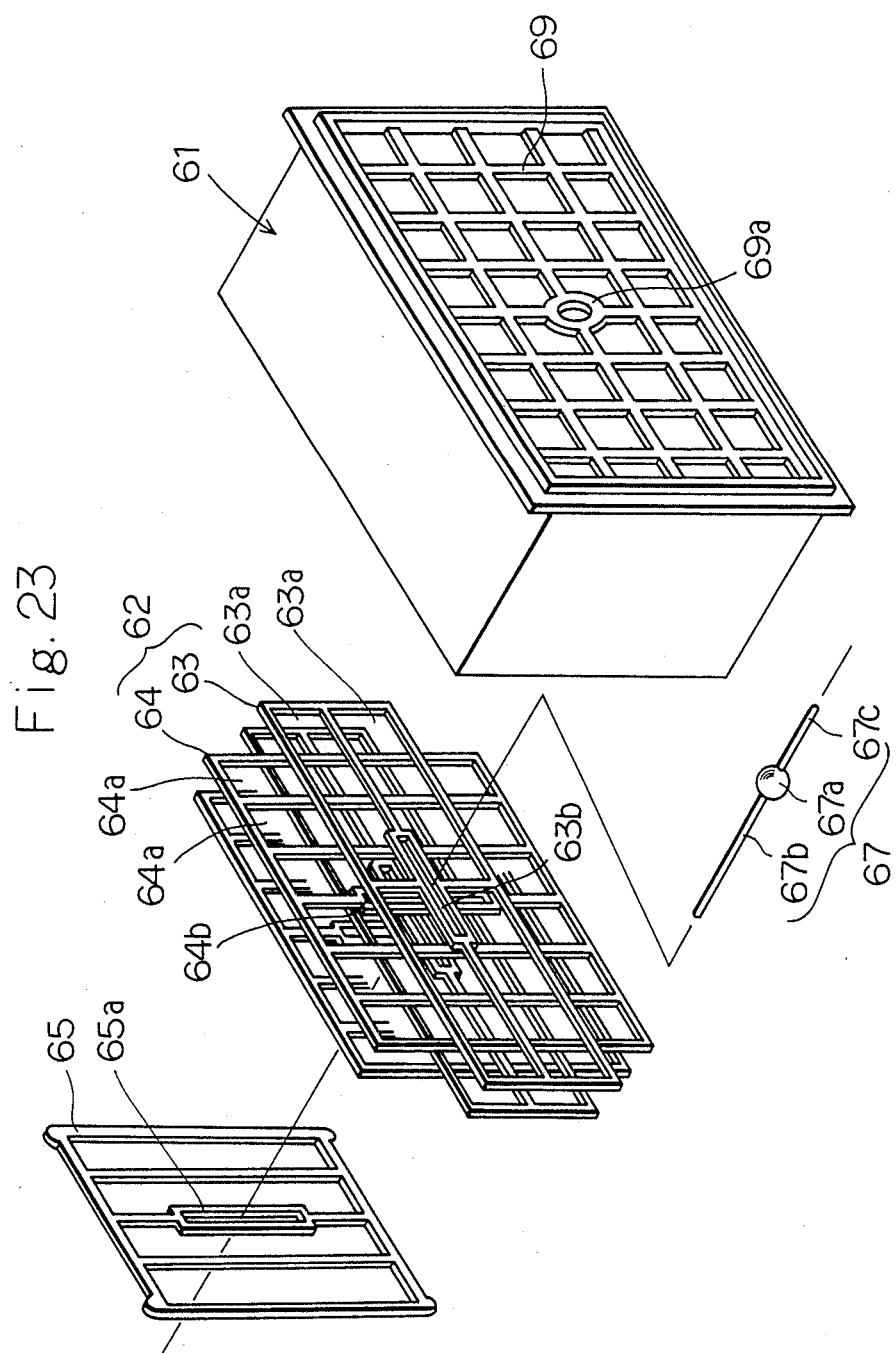
FIG. 23 is an exploded perspective view of a sixth embodiment of the present invention.
Figure 24:
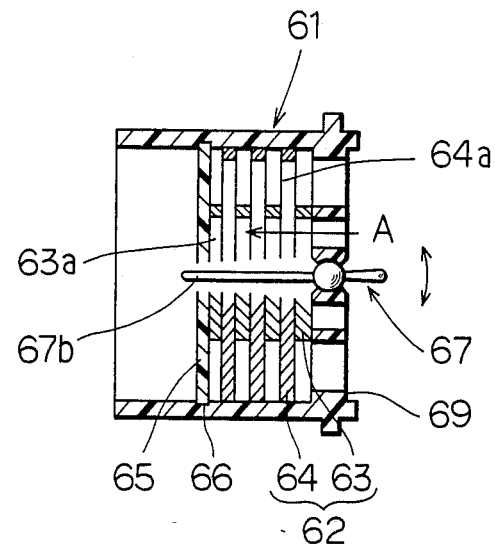
FIG. 24 is a vertical section through the sixth embodiment when assembled.
Figure 25:
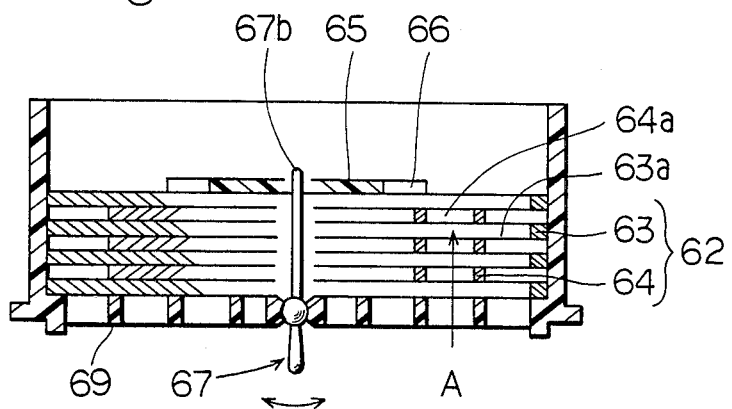
FIG. 25 is a horizontal section through the sixth embodiment when assembled.

(6) Sixth Embodiment (FIGS. 23 to 25)

This embodiment differs from the fifth embodiment in the arrangements described below. The sixth embodiment employs an air flow guide member 62 which is constituted by a sheet assembly 62 formed by alternately laminating first and second sheets 63 and 64. Each first sheet 63 has a plurality (two, in the case of the illustrated example) of horizontally elongated bores 63a disposed parallel to each other vertically. The first sheet 63 further has a horizontally elongated guide slit 63b in its center and possesses a width which enables the sheet 63 to slide vertically along the right and left inner walls of a housing 61. Each second sheet 64 has a plurality of vertically elongated bores 64a disposed parallel to each other horizontally. The second sheet 64 further has a vertically elongated guide slit 64b at its center and possesses a height which enables the sheet 64 to slide horizontally along the upper and lower inner walls of the housing 61. In this case, air flow guide bores A are defined by the horizontally elongated bores 63a of the first sheets 63 and the vertically elongated bores 64b of the second sheets 64 which intersect each other. The drive rod 67b of a control member 67 is received through the horizontally and vertically elongated guide slits 63b, 64b and a vertically elongated guide slit 65a provided in the respective centers of the first and second sheets 63, 64 and a rear retainer 65. This embodiment requires no connecting retainer, since the horizontally retaining effect is offered by the upper and lower as well as right and left inner walls of the housing 61.

This embodiment is used in a manner similar to that of the fifth embodiment. More specifically, when the control member 67 is moved vertically, the first sheets 63 alone are moved; when the control member 67 is moved horizontally, the second sheets 64 alone are moved; and when the control member 67 is moved diagonally, the first and second sheets 63 and 64 are moved. In consequence, the air flow guide bores A are orientated to a given direction. During this operation, since the rear retainer 65 can move horizontally but cannot move in the longitudinal direction of the housing 61, the distance by which the sheet assembly 62 is clamped is invariable similarly to the case of the fifth embodiment.

Figure 26:
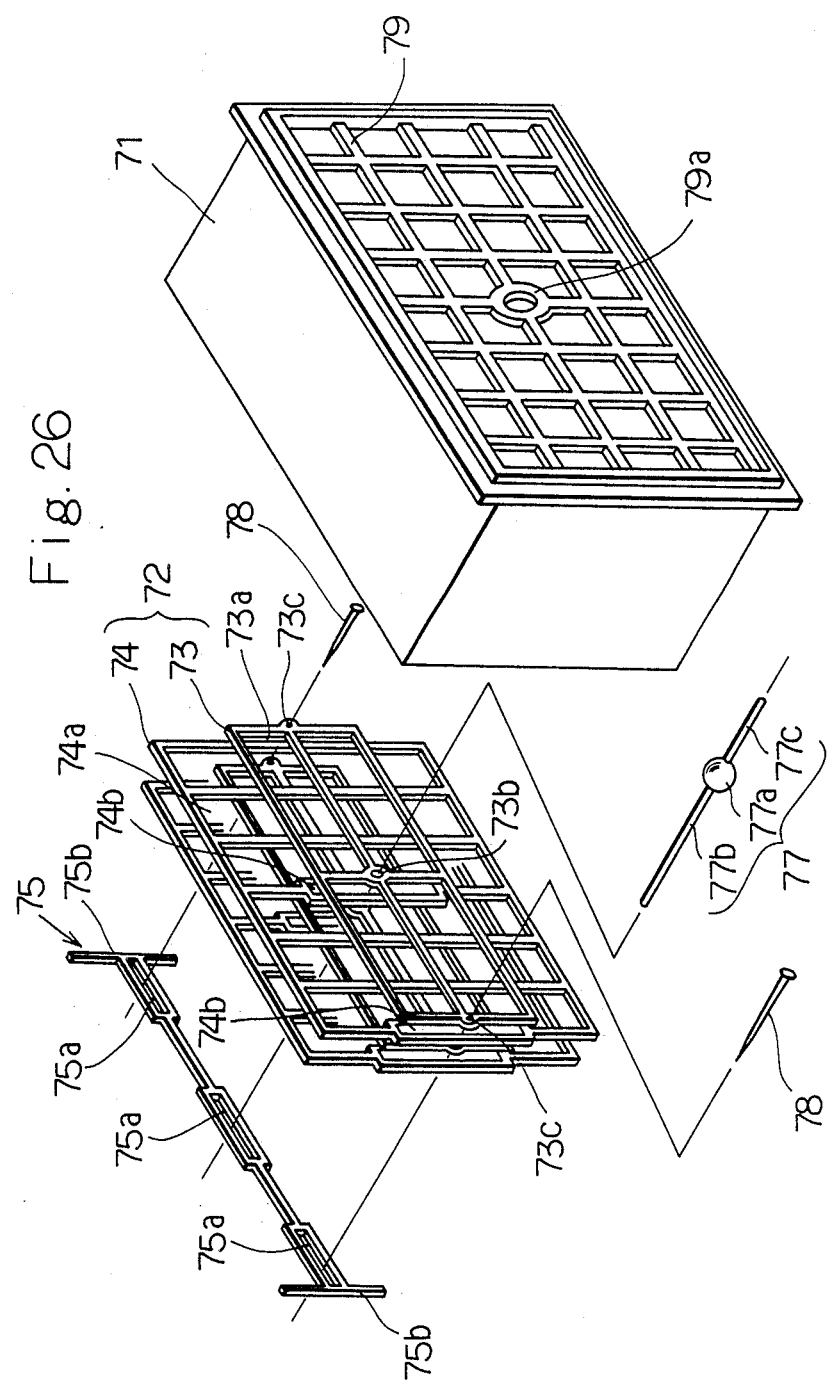
FIG. 26 is an exploded perspective view of a seventh embodiment of the present invention.
Figure 27:
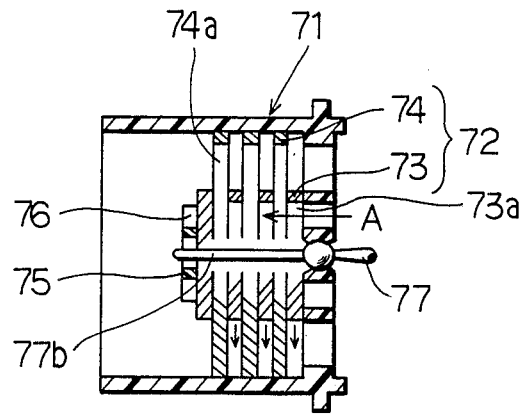
FIG. 27 is a vertical section through the seventh embodiment when assembled.
Figure 28:
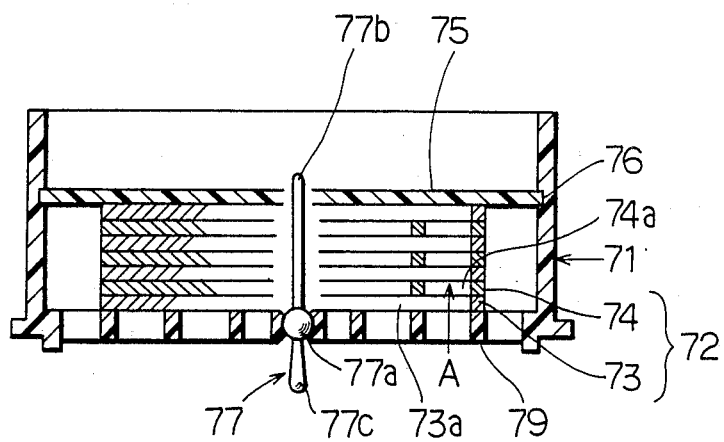
FIG. 28 is a horizontal section through the seventh embodiment when assembled.

(7) Seventh Embodiment (FIGS. 26 to 28)

This embodiment differs from the sixth embodiment in the arrangements described below.

The first sheets 73 have the same width as that of the second sheets 74. Each first sheet 73 has a drive rod-receiving bore 73a in its center and pin-receiving bores 73c at both lateral end portions. The rear retainer 75 has the shape of an H which is composed of a horizontal bar and slide leg portions 75b provided at both ends of the bar which has horizontally elongated guide slits 75a at its center and both ends. The retainer 75 is slidably engaged, through the slide leg portions 75b, with a pair of slide grooves 76 which are respectively formed in the right and left inner wall surfaces of the housing 71 so as to extend vertically. The drive rod 77b of a control member 77 is received through the drive rod-receiving bores 73b, the vertically elongated guide slits 74b and the horizontally elongated guide slit 75a provided in the respective centers of the first and second sheets 73, 74 and the rear retainer 75. A pair of connecting pins 78 are received through the pin-receiving bores 73c, the vertically elongated guide slits 74b and the horizontally elongated guide slits 75a provided at both ends of the first and second sheets 73, 74 and the rear retainer 75 in order to retain the first sheets 73 horizontally.

This embodiment is used in a manner similar to that of the fifth embodiment. More specifically, air flow guide bores A are defined by the horizontally elongated bores 73a of the first sheets 73 and the vertically elongated bores 74a of the second sheets 74 which intersect each other. When the control member 77 is moved vertically, the first sheets 73 alone are moved by the action of the drive rod 77b; when the control member 77 is moved horizontally or diagonally, the first and second sheets 73 and 74 are moved. In consequence, the air flow guide bores A are orientated to a given direction. During this operation, since the rear retainer 75 can move vertically but cannot move in the longitudinal direction of the housing 71, the distance by which the sheet assembly 72 is clamped is invariable.

The rear retainer of this embodiment is not necessarily exclusive and other retaining means may be employed, provided that the means employed is retained by the housing so as to be immovable in the longitudinal direction of the housing and does not obstruct the movement of the drive pin for orientating the air flow guide bores to a given direction, for example, a spring wire which is stretched vertically or horizontally between the opposing inner walls of the housing.

It must be noted that the sheets employed in each of the embodiments described above are drawn in the Figures in such a way that they have a relatively large thickness and the number of sheets is relatively small from the illustrative point of view. In fact, the thickness is much smaller (0.5 to 1.5 mm, in general), and the number of sheets is larger than that of the illustrated ones, for example, 10 to 20 sheets. Further, the arrangement may be such that a fixed sheet is formed in a central portion of the sheet assembly, and the control member is moved about a fulcrum or support point provided on the fixed sheet.

Figure 29:
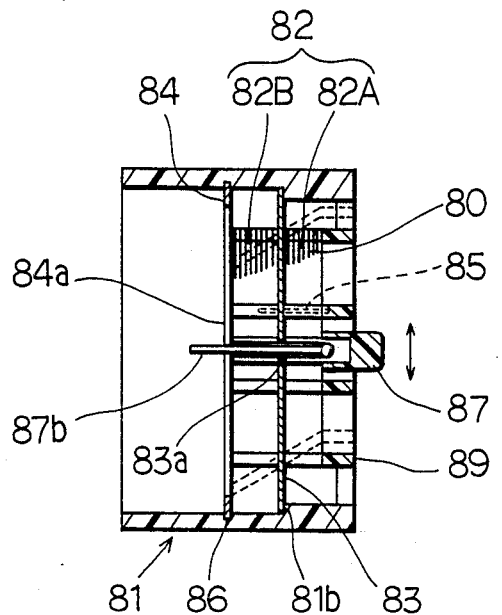
FIG. 29 is a vertical section through an eighth embodiment of the present invention when assembled.
Figure 30:
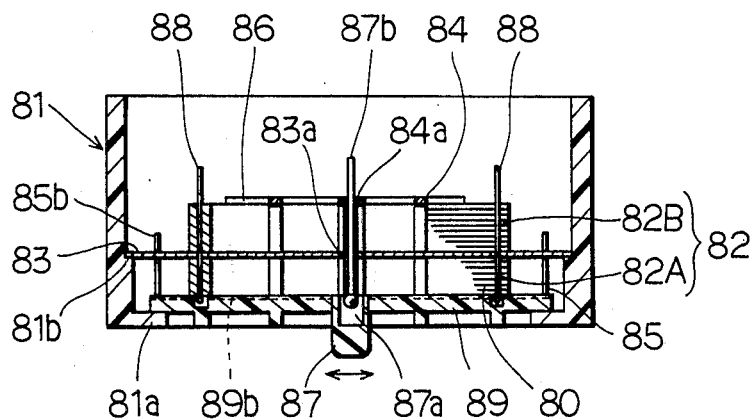
FIG. 30 is a horizontal section through the eighth embodiment when assembled.
Figure 31:
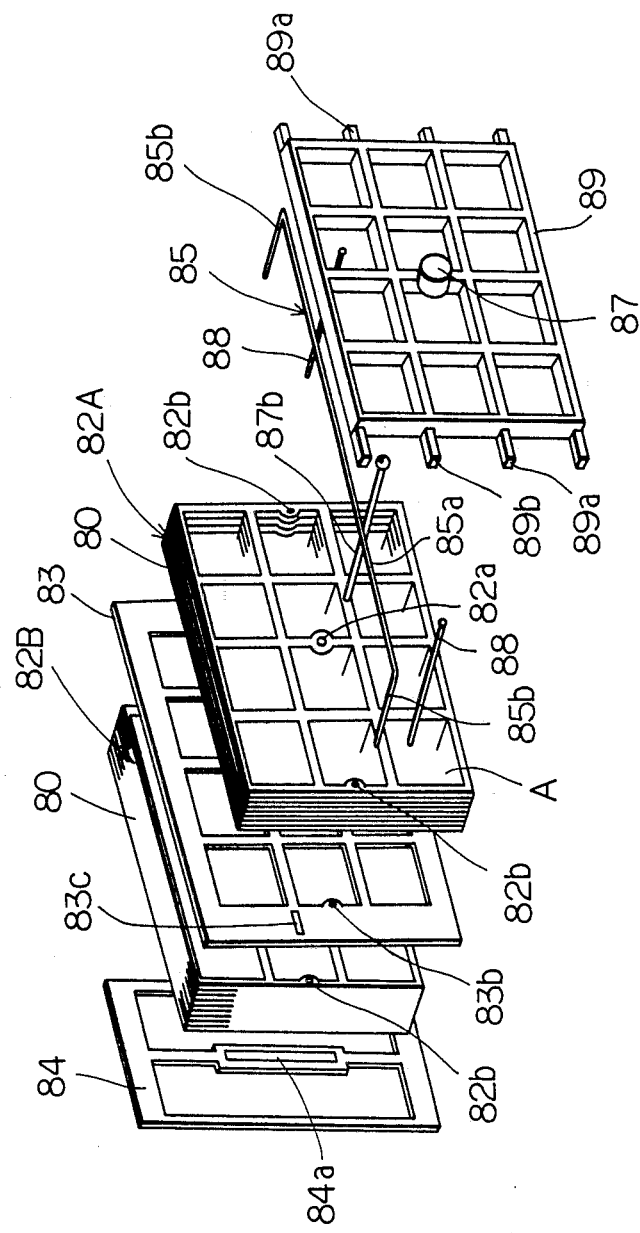
FIG. 31 is an exploded perspective view of the eighth embodiment, which shows all the parts or elements thereof except for the housing.

(8) Eighth Embodiment (FIGS. 29 to 31)

This embodiment comprises a housing 81, an air flow guide member 82, a fixed sheet 83, a rear retainer 84, connecting pins 88, a plate-like grille member 89, a horizontally retaining pin 85 and a drive pin 87b.

The plate-like grille member 89 has a control knob (control member) 87 in the center of its front surface. A portion of each horizontal bar of the grille member 89 projects from each of the lateral ends of the grille member 89 so as to provide an extension 89a. The grille member 89 is retained on the reverse surface of the front frame 81a of the housing 81. The horizontally retaining pin 85 is composed of a support shaft 85a and horizontally retaining shafts 85b provided at both ends of the shaft 85a. The pin 85 is fitted into a support groove 89b which is formed in the reverse surface of one of the horizontal bars of the grille member 89. The rear retainer 84 is constituted by a vertically elongated frame member designed in correspondence with the arrangement of the vertical bars of the grille member 89. The retainer 84 has a vertically elongated guide slit 84a formed in its centeral vertical bar. The retainer 84 is fitted into a pair of slide grooves 86 which are respectively formed in the upper and lower inner wall surfaces of the housing 81 so as to extend horizontally. Thus, the retainer 84 is retained by the housing 81 so as to be movable horizontally but immovable in the longitudinal direction of the housing 81. The fixed sheet 83 has openings corresponding to the openings of the grille member 89. The fixed sheet 83 is engaged with step portions 81b respectively formed on the inner wall surfaces of the housing 81 at an intermediate position in the longitudinal direction (opening direction) of the housing 81. The air flow guide member 82 is constituted by a sheet assembly composed of a multiplicity of sheets 80 each having openings corresponding to the openings of the grille member 89. The air flow guide member 82 is split into front and rear portions 82A and 82B by the fixed sheet 83. The front and rear portions 82A and 82B are respectively clamped between the grille member 89 and the fixed sheet 83 and between the fixed sheet 83 and the rear retainer 84 in such a manner that the sheets 80 can slide so as to be stepwisely offset from each other. The drive pin 87b is received through a drive pin-receiving bore 82a provided in the center of the air flow guide member 82. The drive pin 87b has its head portion received in a housing hole 87a provided in the reverse surface of the control knob 87 formed on the grille member 89. The intermediate portion of the drive pin 87b is received through a support bore 83a provided in the center of the fixed sheet 83, and the distal end of the drive pin 87b is received through the vertically elongated guide slit 84a of the rear retainer 84. The connecting pins 88 are respectively received through pin-receiving bores 82b formed at both lateral end portions of the air flow guide member 82. Each of the connecting pins 88 has its head portion received in the reverse surface of the grille member 89 and its central portion received through one of the support bores 83b which are provided at both lateral end portions of the fixed sheet 83. The horizontally retaining shafts 85b are respectively received through horizontal guide slits 83c which are formed in the extensions provided at both lateral ends of the fixed sheet 83.

The following is a description of the way in which this embodiment is used.

When an occupant holds the control knob 87 and moves the same vertically, horizontally or diagonally, the drive pin 87b pivots about the support bore 83a of the fixed sheet 83. In consequence, the portions of the air flow guide member 82 located in front and at the rear of the fixed sheet 83 are deformed in such a manner that their respective longitudinal axes pivot with respect to the fixed sheet 83 as a fixed plane. In other words, the sheets 80 slide so as to be stepwisely offset from each other, and the air flow guide bores A are thereby orientated to a given direction. During this operation, since the rear retainer 84 can move horizontally but cannot move in the longitudinal direction of the housing 81, the distance (between the grille member 89 and the rear retainer 84) by which the air flow guide member 82, including the fixed sheet 83, is clamped is invariable. There is therefore no risk of the sheet assembly 82 being undesirably pressed even when the control knob 87 is tilted. Further, since the horizontally retaining pin 85 has its support shaft 85a supported by the support groove 89b of the grille member 89 and its horizontally retaining shafts 85b respectively guided by the horizontal guide slits 83c, the pin 85 prevents the air flow guide member 82 from being twisted, that is, offers a horizontally retaining effect. It must be noted that it is preferable, although not always necessary, to form either or both of the surfaces of each sheet 80 into uneven surfaces for the purpose of practically reducing the area of contact between two adjacent sheets 80. By so doing, the frictional resistance is reduced, and it is possible for the sheets 80 to slide smoothly when stepwisely offset from each other.

The rear retainer of this embodiment is not necessarily exclusive and other retaining means may be employed, provided that the means employed is retained by the housing so as to be immovable in the longitudinal direction of the housing and does not obstruct the movement of the drive pin for orientating the air flow guide bores to a given direction, for example, a frame member which slides along the right and left inner walls of the housing, or a spring wire which is stretched vertically or horizontally between the opposing inner walls of the housing.

Figure 32:
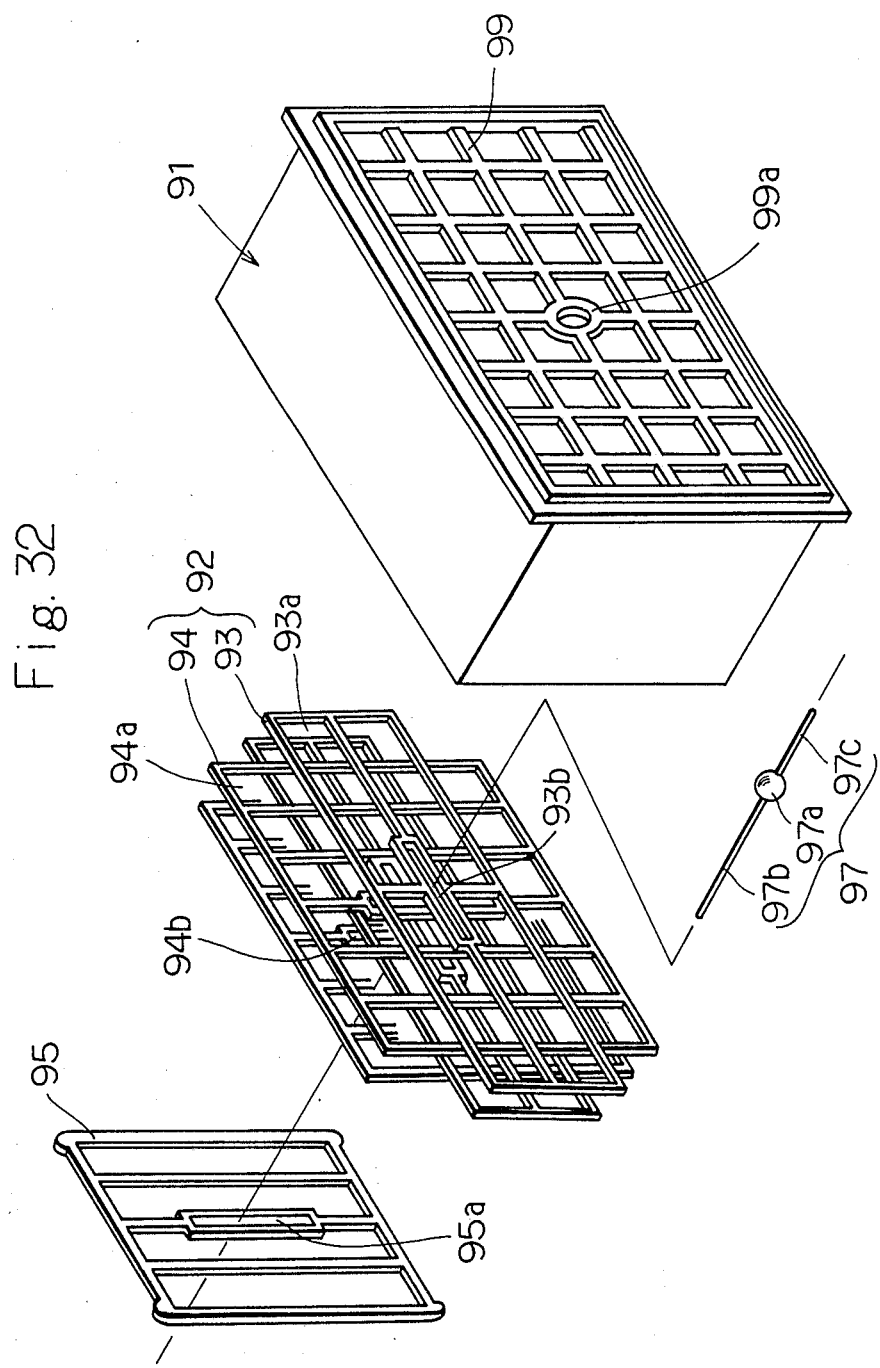
FIG. 32 is an exploded perspective view of a ninth embodiment of the present invention.
Figure 33:
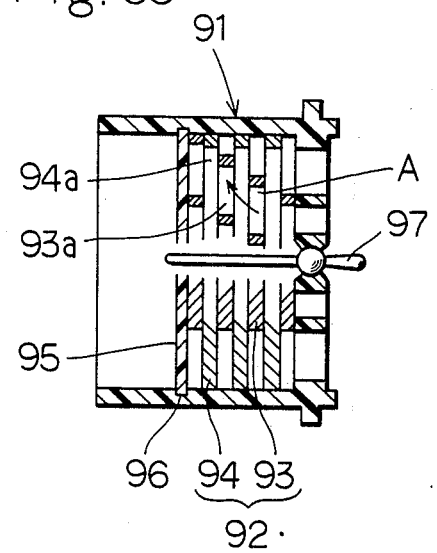
FIG. 33 is a vertical section through the ninth embodiment when assembled.
Figure 34:
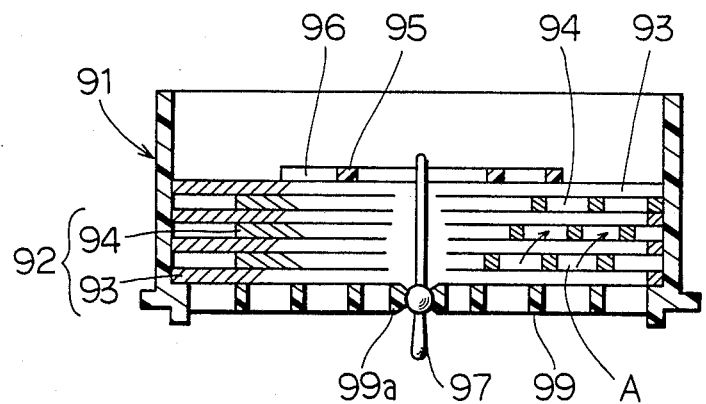
FIG. 34 is a horizontal section through the ninth embodiment when assembled.

(9) Ninth Embodiment (FIGS. 32 to 34)

This embodiment comprises a housing 91, an air flow guide member 92, a rear retainer 95 and a control member 97. The housing 91 has the shape of a hollow parallelepiped with a flange along the outer periphery of its front surface which is constituted by a fixed grille member 99 of vertical and horizontal bars.

The control member 97 is composed of a ball portion 97a, and a drive pin 97b and a knob 97c disposed at both sides of the ball portion 97a. The ball portion 97a is supported by a pair of opposing spherical surfaces of a ball-receiving portion 99a formed in a substantially central portion of the grille member 99. The rear retainer 95 is constituted by a frame member with vertical bars in correspondance with the arrangement of the vertical bars of the grille member 99. The retainer 95 has a vertically elongated guide slit 95a formed in its central vertical bar. The retainer 95 is engaged with a pair of slide grooves 96 which are respectively formed in the upper and lower wall surfaces of the housing 91 so as to extend horizontally. Thus, the retainer 95 is retained by the housing 91 so as to be immovable in the longitudinal direction of the housing 91. The air flow guide member 92 is constituted by a sheet assembly formed by alternately laminating first and second sheets 93 and 94. Each first sheet 93 has a plurality of horizontally elongated bores 93a disposed parallel to each other vertically in correspondence with the distance between two adjacent horizontal bars of the grille member 99. The first sheet 93 further has a horizontally elongated guide slit 93b at its center and possesses a width which enables the sheet 93 to slide vertically along the right and left inner walls of the housing 91. Each second sheet 94 has a plurality of vertically elongated bores 94a disposed parallel to each other horizontally in correspondence with the distance between two adjacent vertical bars of the grille member 99. The second sheet 94 further has a vertically elongated guide slit 94b in its center and possesses a height which enables the sheet 94 to slide horizontally along the upper and lower inner walls of the housing 91. The sheet assembly has air flow guide bores A defined by the horizontally elongated bores 93a of the first sheets 93 and the vertically elongated bores 94a of the second sheets 94 which intersect each other, the guide bores A corresponding to the openings of the grille member 99. The drive pin 97b of the control member 97 is received through the horizontally and vertically elongated guide slits 93b, 94b and the vertically elongated guide slit 95a formed in the respective centers of the first and second sheets 93, 94 and the rear retainer 95. It must be noted that each of the sheets is obtained by blanking a sheet of a synthetic resin such as ABS or PP, or a sheet of paper, or by injection molding or other similar means.

The following is a description of the way in which this embodiment is used.

When an occupant holds the knob 97c of the control member 97 and moves the knob 97c vertically from the neutral position, the first sheets 93 alone are moved by the action of the drive pin 97b; when the knob 97c is moved horizontally, the second sheets 94 alone are moved; and when the knob 97c is moved diagonally, the first and second sheets 93 and 94 are moved. Thus, while sliding along the upper and lower or right and left inner wall surfaces of the housing 91, the sheets move so as to be stepwisely offset from each other, and the air flow guide bores A are thereby orientated to a given direction as shown in the upper half of FIG. 33 or the right half of FIG. 34. During this operation, since the rear retainer 95 can move horizontally but cannot move in the longitudinal direction of the housing 91, the sheet assembly constituted by the first and second sheets 93 and 94 are retained between the rear retainer 95 and the fixed grille member 99 in the longitudinal direction of the housing 91.

The movement of the drive pin 97 will now be described in more detail. When moved vertically, the drive pin 97 abuts against the upper or lower wall of the horizontally elongated guide slit 93b of each first sheet 93 but slides within the vertically elongated guide slit 94b of each second sheet 94; when moved horizontally, the pin 97 abuts against the right or left wall of the vertically elongated guide slit 94b of each second sheet 94 but slides within the horizontally elongated guide slit 93b of each first sheet 93. In consequence, the first and second sheets 93 and 94 are moved as described above.

The rear retainer of this embodiment is not necessarily exclusive and other retaining means may be employed, provided that the means employed is retained by the housing so as to be immovable in the longitudinal direction of the housing and does not obstruct the movement of the drive pin for orientating the air flow guide bores to a given direction, for example, a frame member which slides along the right and left inner walls of the housing, or a spring wire which is stretched vertically or horizontally between the opposing inner walls of the housing.

It must be noted that the sheets are drawn in the Figures in such a way that they have a relatively large thickness and the number of sheets is relatively small from the illustrative point of view. In fact, the thickness is much smaller (0.5 to 1.5 mm, in general), and the number of sheets is larger than that of the illustrated ones, for example, 10 to 20 sheets.

What is claimed is:

1. An air intake grille having an air flow guide member mounted on a housing in such a manner that the direction of air flow can be adjusted using a control member, said grille comprising:
   (a) said air flow guide member being formed by alternately laminating first and second sheets,
      each of said first sheets having a plurality of horizontally elongated bores disposed parallel to each other vertically and further having a drive pin-receiving bore in its center and connecting pin-receiving bores at both lateral end portions thereof,
      each of said second sheets having a plurality of vertically elongated bores disposed parallel to each other horizontally and a vertically elongated guide slit formed in its center and possessing a height which enables the second sheet to slide horizontally along the upper and lower inner walls of said housing, said connecting pin-receiving bores respectively receiving a pair of connecting pins which are capable of being supported horizontally, and said air flow guide member being clamped between a fixed grille member provided at the front surface of said housing and a rear retainer which is retained by said housing so as to be immovable in the longitudinal direction of said housing; and (b) said control member being supported by said fixed grille member through a pair of opposing spherical surfaces, said control member having a drive pin received through said drive pin-receiving bore and vertically elongated guide slit formed in the respective centers of said first and second sheets.

* * * * *